Patented Oct. 21, 1930

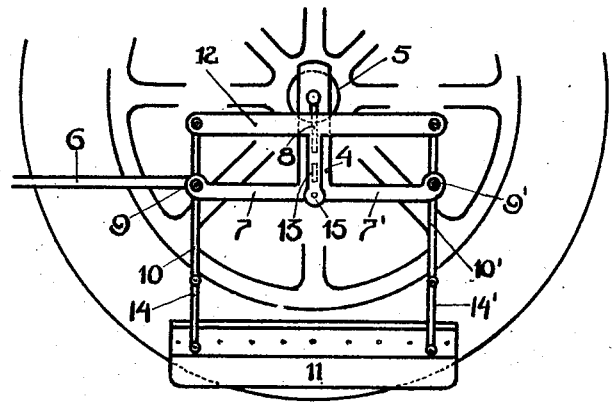
FIG:1.
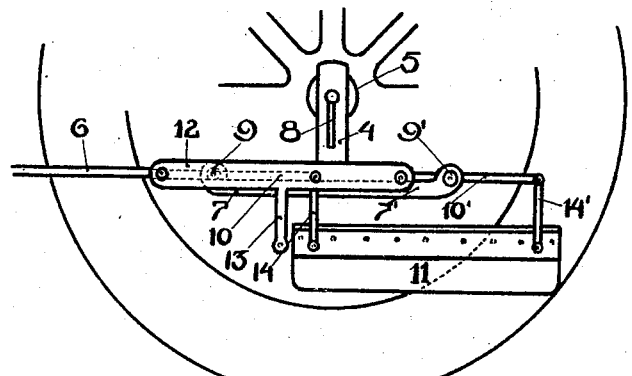
FIG:2.
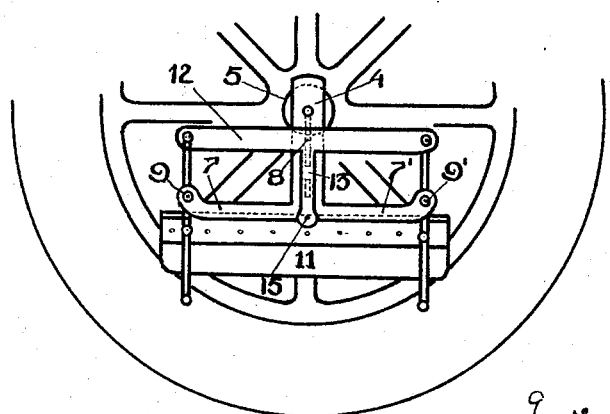
FIG:3.

1,779,331

UNITED STATES PATENT OFFICE

LUDOVICUS HENDRICUS POLLAERT, OF ROERMOND, NETHERLANDS

VEHICLE SPLASH GUARD

Application filed November 11, 1927, Serial No. 232,637, and in the Netherlands November 12, 1926.

This invention relates to side guards or deflectors for vehicle wheels, particularly for use with automobiles, to prevent splashing of water, mud and/or dirt to the side of the vehicle.

The primary objects of the present invention are: to provide a guard and supporting and positioning means therefor which will maintain the splasher-guard or deflector plate in a plane parallel to the side of the wheel in connection with which it is used; to provide a construction preventing the lateral displacement of the said guard or deflector plate; to provide a counterbalancing means for said guard or deflector plate and connections between said counterbalancing means and said plate whereby the latter will be normally held in position but may yield and move rearward and upward when encountering an obstruction in the roadbed or at the side thereof and will return automatically to normal position when it has passed said obstruction; to avoid substantial movement of the splash-guard or deflector plate from normal position when the speed of travel is suddenly changed; and to provide means whereby said splash-guard or deflector plate may be moved to, and held in, inoperative position.

Herein I show and describe only the preferred embodiment of my invention simply by way of illustration of the practice of my invention, as by law required. However, I am aware that my invention is capable of other and different embodiments, and that the various details thereof may be modified in a number of different ways, all without departing from my said invention. Therefore, the drawing and description herein are to be considered as merely illustrative and not as exclusive.

In the accompanying drawing:

Figure 1 represents a side elevation of a guard embodying my invention in normal position as mounted on the rear axle of a vehicle on the outer side of the adjacent rear wheel;

Figure 2, a view similar to Fig. 1, illustrating the parts in the positions they occupy when the plate 11 encounters some object and moves rearwardly upward to pass thereover; and Figure 3, a view similar to Fig. 1, with the plate 11 moved to, and held in, inoperative position.

The guard consists of a supporting-member 4, which may be freely pivotably mounted on the axle 5 of the rear wheel, and attached to the frame by means of a rod 6. The lower end of the supporting-member 4 is provided with two arms 7 and 7', one of them pointing to the left, the other one to the right. Further the supporting-member is provided with a slot 8 permitting vertical adjustment. Levers 10 and 10' are pivotally mounted intermediate their ends in the ends of the respective arms 7 and 7' by pivots 9 and 9' respectively, the portions of said levers 10 and 10' below their respective pivotal points being of equal length, and their portions above said pivotal points being of equal length. Rigid links 14 and 14' respectively pivotally connected to the lower ends of the respective levers 10 and 10' to turn about said pivotal points in a single plane parallel to said arms 7 and 7' and said levers 10 and 10' and respectively pivotally connected to the respective end portions of the splash-guard or deflector plate 11 for relative movement between said plate 11 and said links in the above defined plane only, serve to connect said levers 10 and 10' to said splash-guard or deflector plate 11 and, through the latter with each other for maintaining substantially parallel relation between said levers 10 and 10', and said plate 11 and the counterweight 12.

The rigid counterweight 12 is pivotally connected to the upper ends of the levers 10 and 10' and is of such length as to maintain said levers 10 and 10' in substantial parallelism, and is of such weight as to almost, but not quite, counterbalance the weight of the splash-guard or deflector plate 11 as increased by the leverage of that portion of the levers 10 and 10' between the pivots 9 and 9' and said links 14 and 14' when said levers 10 and 10' are turned from vertical position, whereby the slightest pressure on, or impact by, said splash-guard or deflector plate 11 with an obstruction in, or at the side of, the roadbed while the automobile is traveling forward will result in deflecting the plate 11 rearward and upward, as illustrated in Fig. 2. After the impact and after the obstruction has been passed, the weight of the plate 11, as increased by the leverage of the levers 10 and 10' in their changed position is sufficiently greater than the weight of counterweight 12 as increased by the upper portions of the levers 10 and 10' to cause the levers 10 and 10' to move back to normal vertical position, raising the counterweight 12 and moving it rearward to normal position, while the splash-guard or deflector plate 11 drops down and moves forward to its normal position.

The parts being connected in a hinged manner to each other and moving very easily an elastic strip 13 has been rigidly fixed to the centre of the weight 12 in order to prevent the swinging of the apparatus when driving; this elastic member being provided at its lower end with a circular aperture or eye. When the splash-guard or deflector plate 11 is in its active position this strip presses with its lower end against the supporting-member 1, which member is moreover provided with a short rounded projection, which in the active position of the splash-guard or deflector plate 11 fits in said opening at the lower end of the strip 13, so that there is a small resistance to keep the apparatus in its normal position.

In order to put the apparatus out of operation in dry weather, pivotable rods 14 and 14' are swung in a plane parallel to the arms 7 and 7' and levers 10 and 10' about their respective points of pivotal connection to said levers respectively to raise the splash-guard or deflector plate 11 up for substantially the full length of said links 14 and 14' and to dispose said plate 11 between said levers 10 and 10' inward of said plate 11 and said links 14 and 14' extending in such position across the other face of said plate 11, all as shown in Fig. 3. In that position the mud-guard is locked up by means of some fixing members, being put through the eye of the strip 13.

Having thus particularly described and ascertained the nature of my invention and in what manner the same is to be performed, I declare that what I claim as new, and desire to secure by Letters Patent is:

1. An automobile-wheel splash-guard comprising a supporting bracket, a pair of spaced suspending rods pivotally mounted on said bracket, a splash deflector pivotally connected to the lower end portions of said suspending rods below their pivotal mounting, and a counter-weight applied to said suspending rods above their pivotal mounting, said counter-weight approximating the applied force of the weight of said deflector as increased by the leverage of the rods and yet being slightly less than such force, whereby said splash-deflector will normally hold itself in operative position, and whereby the force of momentum of said counter-weight and of said splash-deflector will substantially neutralize each other, avoiding movement of the splash-deflector out of normal position when the speed of travel is varied.

2. An automobile-wheel splash-guard comprising a supporting bracket, a pair of spaced relatively rigid suspending rods pivotally mounted on said bracket, a splash-deflector pivotally connected to the lower end portions of said suspending rods below their pivotal mounting, and a counter-weight applied to said suspending rods above their pivotal mounting, said counter-weight and bracket together serving to at all times maintain the same relation between the longitudinal central lines of said rods, and said counter-weight approximating the applied force of the weight of said splash-deflector as increased by the leverage of said rods and yet being slightly less than said force, whereby said splash-deflector will normally hold itself in operative position, and whereby the force of momentum of said counter-weight and of said splash deflector will substantially neutralize each other, avoiding movement of the splash-deflector out of normal position when the speed of travel is varied.

3. An automobile-wheel splash-guard comprising a supporting bracket, a pair of spaced relatively rigid rods pivotally mounted on said bracket, a splash-deflector pivotally connected to the lower end portions of said suspending rods below their pivotal mounting, a counter-weight applied to said suspending rods above their pivotal mounting, said counter-weight approximating the applied force of the weight of said splash-deflector as increased by the leverage of said rods and yet being slightly less than said force, and yielding means extending from said counter-weight and engaging said bracket to hold the parts in normal position against vibration and jars incident to traveling over a rough road-bed.

4. An automobile-wheel splash-guard comprising a supporting bracket, a pair of spaced relatively rigid rods pivotally mounted on said bracket, a splash-deflector, links respectively pivotally connected to the respective suspending rods below their pivotal mounting and to said deflector, whereby said deflector may be turned up to inoperative position parallel to said rods and whereby independent lateral swinging movement of said deflector is prevented, and a counter-weight applied to said suspending rods above their pivotal mounting, said counter-weight approximating the applied force of the weight of said deflector as increased by the leverage of said rods and yet being slightly less than such force.

5. An automobile-wheel splash-guard comprising a supporting bracket, a pair of relatively rigid spaced rods pivotally mounted on said bracket, a splash-deflector pivotally connected to the lower end portions of said suspending rods below their pivotal mounting, a counterweight applied to said suspending rods above their pivotal mounting, said counter-weight approximating the applied force of the weight of said deflector as increased by the leverage of said rods and yet being slightly less than said force, a protrusion extending from said bracket, and resilient means carried by said counter-weight and formed with a socket normally receiving said protrusion to maintain the parts in normal position against the influence of jars and vibration incident to travel over a rough road-bed.

In testimony whereof, I have signed my name to this specification at The Hague this 28th day of October, 1927.

LUDOVICUS HENDRICUS POLLAERT.